United States Patent Office 2,750,316
Patented June 12, 1956

2,750,316

ADHESIVE TAPES

Cyrus W. Bemmels, New Brunswick, N. J., assignor to Permacel Tape Corporation, New Brunswick, N. J., a corporation of New Jersey Application August 13, 1954, Serial No. 449,712

12 Claims. (Cl. 154—53.5)

This invention relates to strand reinforced tapes and more particularly to strand reinforced tapes of the normally tacky and pressure-sensitive type.

There are certain characteristics which are desirable in all tapes and depending upon the use to which the tape will be put, one particular characteristic is enhanced and emphasized, generally to the detriment of the others. For example, in many applications such as packaging, and particularly bundling of heavy or bulky articles, strength is considered the critical attribute, and this quality is improved, generally by employing a backing of increased gauge or utilizing a number of laminations of material to form the backing, producing a bulky tape lacking flexibility and being generally unaesthetic. In other applications, decorative appearance may be the primary object of design, strength being desirable, but not the critical factor. In such tapes, the adhesive mass is generally very thin, and the backing of light gauge, frequently colored or printed in an attractive manner. In a third circumstance flexibility and conformance to odd shapes may be critical. This attribute is desirable when an odd shape is to be bound such as, for example, an irregular article of manufacture or a cable end. However, in both of the latter uses, strength is of importance and is partially sacrificed only to the extent necessary to attain the other desired characteristics.

The construction of reinforced pressure-sensitive tape preferably includes a flexible backing which readily transmits the pressure applied to one surface thereof to bring an adhesive coating applied to the opposite surface into intimate contact with the surface to be adhered to. A stiff backing is frequently responsible for insufficient adhesion and insufficient conformance of the tape to the contours and interstices of the joined surfaces.

However, to overcome the weakness of some prior adhesive tapes, attempts have been made to increase the tensile strength of the tape by increasing the gauge of their backings. This produces a stronger tape which may be too bulky and stiff to adhere adequately to the desired surfaces.

It is, therefore, an important object of this invention to provide an improved pressure-sensitive adhesive tape having increased strength.

It is another object of this invention to provide an improved adhesive tape having increased strength and flexibility.

It is a further object of this invention to provide an adhesive tape wherein a given thickness of backing material will possess improved strength and flexibility.

Another object of this invention is the provision of an improved adhesive tape of increased strength and flexibility adapted for decorative use and ornamentation.

It is still another object of this invention to provide an improved strand reinforced pressure-sensitive tape in which the strands are positively secured to the backing material and not subject to inadverent shifting or removal.

It is another object of this invention to provide an adhesive tape having improved appearance subject to colorful treatment.

It is another object to provide an improved tape having a high luster and sheen combined with unusual strength, thinness and good flexibility.

Further and additional objects of this invention will become manifest from a consideration of this description, the accompanying drawings, and the appended claims.

In one form of this invention an adhesive tape is provided comprising an integral structure including a backing element, a bonding coating, a plurality of relatively strong spaced strands, and a normally tacky pressure-sensitive adhesive coating. More particularly, an adhesive tape is provided in which a plurality of individual isolated strands of relatively great tensile strength are disposed longitudinally of a backing element and secured to one surface thereof by a bonding coating applied to said surface. A relatively thin film of a normally tacky pressure-sensitive adhesive is applied to the other surface of the reinforced element, and the resulting tape is generally packaged as a long, relatively narrow strip wound in roll form. In a preferred form the bonding coating is of a pliable and elastic nature whereby the strands may stretch to a slight degree or shift axially to produce a balanced structure having high tensile strength.

For a more complete understanding of this invention reference will now be made to the accompanying drawing wherein.

It should be clearly understood that the figures of the drawings are more or less diagrammatic in form to better illustrate the application of the principles involved. The dimensions and proportions are selected to clearly define the various elements of the structures and may vary substantially from those shown when incorporated into particular commercial products.

Figure 1:
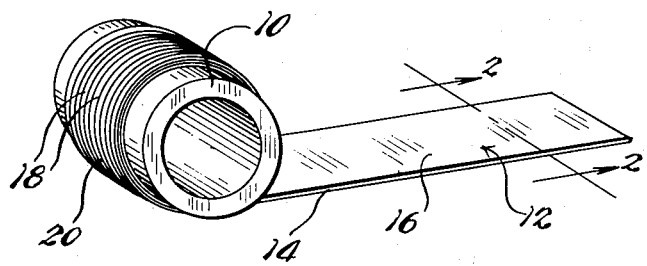
Fig. 1 is a perspective view of a roll of tape incorporating the teaching of this invention.

Referring now to the drawing, and more particularly to Fig. 1, a cylindrical roll 10 is illustrated on which an elongate tape 12 is wound, said tape comprising a flexible backing sheet or element 14 on one surface of which a normally tacky pressure-sensitive adhesive 16 is deposited. The element 14 has secured to the opposite surface thereof a layer of reinforcing material comprising a plurality of individually isolated, longitudinally extending strands 18 of relatively strong material embedded in a bonding coat 20.

Figure 2:
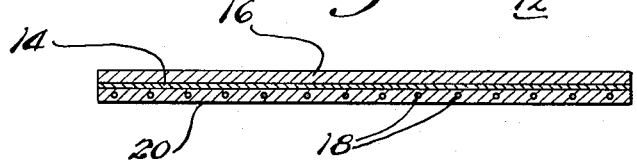
Fig. 2 is a transverse sectional view of the tape shown in Fig. 1 taken on the line 2—2 thereof.

The transverse section of Fig. 2 clearly illustrates the relative disposition of the flexible backing 14, the adhesive coating 16, the plurality of strands 18 and the bonding coat 20. As shown therein, the strands 18 are internally disposed within the bonding coat 20 which is one preferred form of the invention. However, it is within the scope of the invention to secure the strands to the element 14 in such a manner that the strands are immediately adjacent to the outer surface of the bonding coat 20. It is contemplated that in all embodiments of this invention the strands 18 will be secured in the bonding coat 20 preferably as a result of a portion of the bonding coat filling the interstices of the strand material or surrounding the strands, said bonding coat also adhering tenaciously to the surface of the backing element 14. The bonding coat is preferably of a non-tacky material which possesses some degree of elasticity or yieldability whereby the strands will be retained in predetermined position on the backing element though capable of slight longitudinal axial movement relative to the backing. It is preferred that the bonding coating and the adhesive coating adhere to one another with slight tenacity. However, to reduce the adherence of these coatings, a release coating may be applied to the bonding coating, if required.

Figure 3:
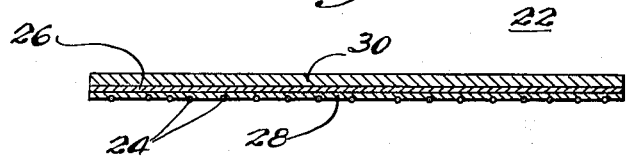
Fig. 3 is a transverse sectional view of an alternate embodiment of this invention.

An alternate embodiment 22 is illustrated in Fig. 3. Therein the strands 24 are secured to the backing 26 by a relatively thin bonding coat 28 deposited on one surface of the backing element 26. The bonding material 28 may completely surround the strands 24 or may merely substantially fill the interstices between the various filaments to secure the strands to the backing. The strands 24 determine, in part, the outer configuration of the entire tape structure 22, thus providing a means for decorative or contrasting color treatment of the backing and strands. An adhesive coating 30 is applied to a surface of element 26 which is opposite the surface to which bonding coat 28 is applied.

Figure 4:
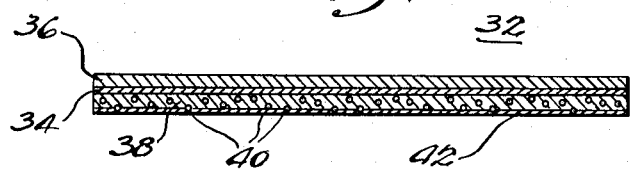
Fig. 4 is a transverse sectional view of a third embodiment of the invention.

A third embodiment of the invention is illustrated in Fig. 4. The tape 32 illustrated in Fig. 4 comprises a backing element 34 which may be either fibrous or nonfibrous, woven or nonwoven, an adhesive coating 36 applied to one surface of the element 34 and a bonding coat 38 applied to the other surface. A plurality of strands 40 of reinforcing material are disposed in random spaced relationship in the bonding coat 38. Some of the strands may be completely embedded in the internal portion of the bonding coat 40, some may be embedded at the surface of the bonding coat, and some may be embedded so as actually to protrude above the surface of the coating with the coating merely filling the spaces between the various filaments forming the strands. This embodiment is, in essence, a combination of the teachings of the various structures already described. In some cases it may be desirable to add a back sizing or release coating 42 to prevent or reduce adherence of the adhesive 36 to either the bonding coat 38 or the strands 40.

By providing backing elements and strands of contrasting colors, the tape thus produced has an unusual and attractive appearance. Furthermore, by positioning the strands on the back of the element a reduced adhesive coating 30 may be employed while still obtaining all of the advantages of a balanced tape as set out in my copending application S. N. 81,707.

The bonding coat must be a material or combination of materials which will adhere tenaciously to the elements 14, 26 and 34, and also hold the strands 18, 24 and 40 in their spaced relationship. It will be understood that various methods of construction will occur to one skilled in the art and that all such techniques fall within the teaching of this invention if the result is an adhesive tape having the desired strength, flexibility and gauge and utilizing generally a plurality of longitudinal strands embedded in a bonding coat disposed on the back side of a backing material having a modicum of elasticity.

The backing used may be any of a wide variety of films such as ethyl cellulose film; cellulose acetate; cellulose acetate butyrate; cellulose propionate; polymers or copolymers of polyvinylidene chloride-vinyl chloride and/or -acrylonitrile; polyethylene; vinyl chloride polymers such as polymers of vinyl chloride and vinyl acetate; polyfluoroethylenes such as polytetrafluoroethylene and polytrifluorochloroethylene; polyvinyl alcohol; superpolyamides of the nylon type, polystyrene, e. g., the polymers of styrene and isobutylene; regenerated cellulose; benzyl cellulose; cellulose nitrate; gelatin; flexible glass films; glycol cellulose; flexible acrylates and methacrylates; rubber films; chlorinated rubber; cyclized rubber; rubber hydrochloride; starch films, urea aldehyde films; polyvinyl acetal; polyvinyl butyral; and metallic films such as aluminum, copper, gold, iron, lead, magnesium, tin, and zinc foils.

If woven or nonwoven fibrous backings are used they may be fibrous elements composed of superpolyamide, asbestos, cotton, linen, rayon, felt, matted glass, glassine, Japanese tissue, leather, a mixed rubber-fiber backing, unitized paper, impregnated paper such as paper impregnated with rubbery masses similar to pressure-sensitive adhesives, coated paper, treated paper such as internally bonded, etherified, or parchmentized paper, rope paper, oriented paper, nonwoven fibers bonded at intervals adhesively and any other coated impregnated or treated fibrous woven or nonwoven backings.

The preferred strands are composed of glass, but any other strands having high tensile strength may be substituted therefor. For example, either spun strands, thin filaments of substantial length collected together, either twisted or nontwisted, or monofilaments of various synthetic materials may be employed. Cellulose acetate, cellulose propionate or other cellulose esters, superpolyamides of the nylon type, rayon, vinylidene chloride interpolymers, cotton threads, linen threads or silk threads may be used. The term "strands" is used in a broad sense herein to include all elongated elements having the desired characteristics whether said elements be twisted, braided, multi- or mono-filaments, rope-like assemblies or wire. Strands having a twist imparted thereto are somewhat preferred as such strands are easier to anchor on the backing to produce a strong ultimate product.

As explained above, the bonding coat may be a tacky adhesive preferably based on a soft rubber cohesive agent or, in other preferred embodiments, may be based upon a soft rubber of elastomer, i. e., a vulcanizable polymer similar to natural rubber and having the elastic properties of natural rubber. However, if a normally tacky bonding coating is employed a release coating must also be applied to avoid excessive adherence of the bonding coating to the adhesive coating or other surfaces with which it may come into contact. Among suitable rubbers are the interpolymers of butadiene with acrylic compounds having no additional aliphatic substitution or with acrylic compounds having substitution by a short alkyl group. Other rubbers that may be used to equal advantage are natural rubber, reclaimed rubber, butadiene-styrene and substituted styrene copolymers, polychloroprene, cyclized rubber or other heat-treated rubber, soft chlorinated rubber or rubber hydrochlorides, polyisobutylene, including polyisobutylene which has been partially unsaturated by copolymerization with a minor portion of a diene. Among butadiene interpolymers those comprising forty per cent or more of butadiene and including a significant portion of styrene, acrylonitrile and/or equivalent copolymerizing constituent are preferred. Too high an amount of the nonbutadiene ingredient causes the rubber interpolymer to be relatively resinous and somewhat too stiff for best bonding action.

The bonding coat is preferably applied to a dry coating weight of 0.1–3 ounces per square yard. The adhesive coating may be any one of many familiar adhesives which are rubbery, normally tacky and pressure-sensitive. For best results the adhesive coating is spread on the backing to a dry coating weight of 0.5 to 5 ounces per square yard. However, these ranges are recited merely as a suggested working range and other values may be substituted therefor under certain conditions.

Typical backing, bonding and adhesive materials are recited hereinafter, these typical specific materials being within the general classes defined above. The proportions of all constituents of the various examples hereinafter listed are in terms of parts by weight, unless otherwise specified.

Backings:

*Backing A*

Rope saturating paper (12 lbs. basic weight) impregnated with an equal weight of a latex impregnant consisting of equal parts by weight of: 75 butadiene 25 acrylonitrile copolymer (90 Mooney) 50 styrene 50 butadiene copolymer (75 Mooney)

*Backing B*

2-mil kraft saturating paper impregnated with 1.25 ozs. per sq. yd. (dry weight) of an interpolymer latex consisting of a monomer ratio of 50:25:25 butadiene: styrene: acrylonitrile, and polymerized to a 70 Mooney viscosity at 100° C.

Bonding coatings:

Bonding coating A

| | Parts |
|---|---|
| 50 styrene 50 butadiene copolymer (45 Mooney viscosity) | 100 |
| Coumarone indene resin (M. P. 110–135° C.) | 125 |
| Alkylated polyhydroxy phenol (M. P. 165° C.) | 2 |
| Heptane | 300 |

Bonding coating B

| | Parts |
|---|---|
| Polychloroprene (Mooney viscosity 60) | 100 |
| Coumarone indene resin (M. P. 110–135° C.) | 80 |
| Toluene | 500 |

Bonding coating C

| | Parts |
|---|---|
| Pale crepe | 100 |
| Glycerol ester of hydrogenated rosin (M. P. 84° C.) | 30 |
| Polyterpene resin (M. P. 115° C.) | 30 |
| Zinc dibutyl dithiocarbamate | 1 |

Bonding coating D

| | Parts |
|---|---|
| 75 butadiene 25 acrylonitrile (85 Mooney) | 100 |
| Thermosetting pure phenol-formaldehyde resin (M. P. 75° C.) | 10 |
| Mixture of mono- and di-heptyl diphenylamines | 2 |
| Toluene | 400 |

Bonding coating E

| | Parts |
|---|---|
| Polyvinyl chloride (8–10 microns mean diameter) specific viscosity 0.24 | 100 |
| Diethyl phthalate | 35 |
| Basic lead carbonate | 2 |
| Xylol | 20 |

Adhesive coatings:

Adhesive coating A

| | Parts |
|---|---|
| Pale crepe | 100 |
| Glycerol ester of hydrogenated rosin (M. P. 84° C.) | 30 |
| Polyterpene resin (M. P. 115° C.) | 30 |
| Zinc dibuty dithiocarbamate | 2 |

Adhesive coating B

| | Parts |
|---|---|
| Pale crepe | 60 |
| 71 butadiene 29 styrene copolymer (50 Mooney) | 40 |
| Zinc oxide | 100 |
| Polyterpene resin (M. P. 115° C.) | 50 |
| Coumarone—indene resin (M. P. 110–135° C.) | 30 |
| Lanolin | 10 |

Adhesive coating C

| | Parts |
|---|---|
| Polyisobutylene (100,000 mol weight) | 80 |
| Vulcanized vegetable oil | 20 |
| Glycerol ester of hydrogenated rosin (M. P. 85° C.) | 50 |
| Polyisobutylene (1100 mol weight) | 30 |

Adhesive coating D

| | Parts |
|---|---|
| Pure gum reclaim (83.3% rubber hydrocarbon) | 48 |
| Pale crepe | 30 |
| 71 butadiene 29 styrene copolymer (50 Mooney viscosity) | 30 |
| Clay | 40 |
| Glycerol ester of hydrogenated rosin (M. P. 84° C.) | 50 |
| Coumarone—indene resin (M. P. 110–135° C.) | 40 |
| Lanolin | 5 |

Adhesive coating E

| | Parts |
|---|---|
| Pale crepe | 100 |
| Aluminum hydrate | 60 |
| Polyterpene resin (M. P. 70° C.) | 30 |
| Polyterpene resin (M. P. 115° C.) | 30 |
| Lanolin | 10 |
| Normal antioxidant | 1 |

The above listed typical materials have been organized into the following combinations to produce desirable tapes having high tensile strength, light weight, and good flexibility.

I

The backing of this construction is a .0015 inch cellulose acetate film. Viscose rayon 300 denier strands are placed on the back side of the film, each strand having 120 filaments and a twist of 2.5 turns per inch. The cellulose acetate film is coated with an appropriate primer for the adhesive. The primer may be selected from those disclosed in my Patent No. 2,647,843. 100 strands per inch of film width are secured to the back side of the film by a layer of bonding coating A, said layer having a weight of 2.5 ounces per square yard. A layer of adhesive coating A is applied to the opposite side of the film, said adhesive coating weighing 1.5 ounces per square yard. The resulting product has a tensile strength of 200 pounds per inch of tape width and a thickness of .010 inch. A back size or release coating may be applied to the bonding coating to prevent excessive adherence of the tape when in roll form. In this embodiment a back size of 4 ounces per square yard (dry weight) is applied over the bonding coating, the back size having the following constitution:

| | Parts |
|---|---|
| Polystyrene mol wt. 80–100,000 | 70 |
| Ortho nitro biphenyl | 30 |
| Toluene | 400 |

II

A .001 inch backing film of polyethylene terephthalate or mylar is provided in this embodiment to which colored nylon strands are secured at the rate of 150 strands per inch. A primer may be applied as described in Example I. Each strand is a 200 denier thread comprising 34 filaments with a twist of 1 turn per inch. The strands are secured to the back side of the film by bonding coating B, the weight of said bonding coating being 2.5 ounces per square yard. Adhesive coating B is applied to the opposite side of the film to a weight of 0.85 ounce per square yard. The resulting tape has a tensile strength of 310 pounds per inch of tape width and a thickness of .010 inch. The colored nylon strands produce an unusual and attractive appearance in tapes constructed in a manner similar to this example. A back size composed of:

| | Parts |
|---|---|
| ½ second nitrocellulose | 375 |
| 20% solids in commercially mixed solvent castor oil | 25 | is applied to a weight of 2 ounces per square yard (dry weight) over the bonding coating.

III

The backing used in this embodiment is the impregnated rope paper backing A. The backing is .002 inch thick and has 100 strands of colored viscose rayon per inch of tape width secured to its back side by a layer of bonding coating C. The strands are 300 denier and composed of 120 filaments twisted together at the rate of 2.5 turns per inch. The bonding coat is deposited at the rate of 3 ounces per square yard. A weight of 1.75 ounces per square yard of adhesive coating C is applied to the opposite surface of the backing. This tape has a tensile strength of 190 pounds per inch of tape width and a thickness of .012 inch.

IV

A saran film comprises the base of this construction. The film is .002 inch thick and has bonding coat D applied to one surface thereof and adhesive coating D on the opposite surface thereof. A primer may be applied as described in Example I. 100 strands per inch of 300 denier colored viscose rayon are embedded in the bonding coat, each strand comprising 44 filaments being twisted together at the rate of 6 turns per inch. The bonding coat has a weight of 1.5 ounces per square yard and the adhesive coating a weight of 1.25 ounces per square yard. The tape has a tensile strength of 170 pounds per inch of tape width and a thickness of .008 inch.

V

Backing B of unitized kraft paper is employed in this construction. 100 strands per inch of tape width, each strand being 100 denier and comprising 34 filaments with one twist per inch of length, are secured to the back side of the tape. The strands are secured to the backing by a 1.25 ounce per square yard coating of bonding coat E. The bonding coat is fused at 360° F. after being applied to the backing and the strands are embedded therein. Adhesive coating E is applied to the opposite side of the tape with a weight of 1.5 ounces per square yard. This tape is .010 inch thick and has a tensile strength of 100 lbs. per inch of width.

Several methods of manufacture have been generally mentioned above and many more techniques will occur to one skilled in the art. Any of the methods described in my copending application S. N. 81,707 will be equally applicable to the structures disclosed herein.

In certain embodiments it may be necessary or desirable to apply a priming coating to the backing prior to the application of the bonding or adhesive coatings. A primer coating may be applied by any of the common techniques such as print roll, spraying, knife coating or reverse roll coating. For particular priming materials and the manner of use, see my U. S. Patent No. 2,647,843.

The adhesive coating may be applied by any standard method such as calendar coating or solvent or dispersion coating by knife or reverse roller coating.

While particular examples have been recited herein to enable an artisan to construct a tape having the desired physical characteristics of high tensile strength, good flexibility and tenacity, it will be understood that the benefits to be gained from the broad teaching of this invention will be available in other structures, many of which are clearly suggested in this disclosure.

Without further elaboration, the foregoing will so fully explain the character of my invention that others may by applying current knowledge, readily adapt the same for use under varying conditions of service, while retaining certain features which may properly be said to constitute the essential items of novelty involved, which items are intended to be defined and secured to me by the following claims.

I claim:

1. A reinforced pressure-sensitive adhesive tape comprising an elongate flexible backing sheet, an adhesive coating on one surface of said sheet, said coating including an outer continuous surface of normally tacky and pressure-sensitive material, a coating of elastic, yieldable and cohesive bonding material on the other surface of said sheet, and a plurality of relatively strong individual reinforcing strands extending longitudinally of said sheet and spaced laterally from each other, said strands being secured in said bonding coating and disconnected mechanically from each other except for said bonding coating which serves as the sole means for retaining said strands in their individual positions.

2. A reinforced pressure-sensitive adhesive tape comprising an elongate flexible backing sheet, an adhesive coating on one surface of said sheet, said coating including an outer continuous surface of normally tacky and pressure-sensitive material, a coating of elastic, yieldable and cohesive bonding material on the other surface of said sheet, and a plurality of relatively strong individual reinforcing strands extending longitudinally of said sheet and spaced laterally from each other, said strands being secured in said bonding coating, said coating substantially filling the space therebetween, said strands being disconnected mechanically from each other except for said bonding coating which serves as the sole means for retaining said strands in their individual positions.

3. A reinforced pressure-sensitive adhesive tape comprising an elongate flexible backing sheet, an adhesive coating on one surface of said sheet, said coating including an outer continuous surface of normally tacky and pressure-sensitive material, a coating of elastic, yieldable and cohesive bonding material on the other surface of said sheets, and a plurality of relatively strong individual reinforcing strands extending longitudinally of said sheet and spaced laterally from each other, said strands being located below the outer surface of and completely surrounded by said bonding coating, said strands being disconnected mechanically from each other except for said bonding coating which serves as the sole means for retaining said strands in their individual positions.

4. A reinforced pressure-sensitive adhesive tape comprising an elongate flexible backing sheet, an adhesive coating on one surface of said sheet, said coating including an outer continuous surface of normally tacky and pressure-sensitive material, a layer of elastic, yieldable and cohesive bonding material on the other surface of said sheet, and a plurality of parallel twisted strands of strong, high tensile strength material extending longitudinally of said tape in said bonding coating and spaced laterally from each other, said strands being embedded in said bonding coating and disconnected mechanically from each other except for said bonding coating which serves as the sole means for retaining said strands in their individual positions.

5. A reinforced pressure-sensitive adhesive tape comprising an elongate flexible nonwoven backing sheet, an adhesive coating on one surface of said sheet, said coating including an outer continuous surface of normally tacky and pressure-sensitive material, a coating of elastic, yieldable and cohesive bonding material on the other surface of said sheet, and a plurality of parallel twisted glass strands of strong, high tensile strength material extending longitudinally of said tape in said bonding coating and spaced laterally from each other whereby said strands are substantially surrounded by said bonding coating and covered to the substantial exclusion of air, said strands being disconnected mechanically from each other except for said bonding coating which serves as the sole means for retaining said strands in their individual positions.

6. A reinforced pressure-sensitive adhesive tape comprising an elongate flexible backing sheet, an adhesive coating on one surface of said sheet, said coating including an outer continuous surface of normally tacky and pressure-sensitive material, a bonding coating on the other surface of said sheet, and a plurality of relatively strong reinforcing strands extending longitudinally of said sheet and spaced laterally from each other, each of said strands comprising a plurality of associated elongate filaments, said strands being embedded in said bonding coating whereby the bonding coating substantially fills the spaces between said filaments, said strands being disconnected mechanically from each other except for said bonding coating which serves as the sole means for retaining said strands in their individual positions.

7. A reinforced pressure-sensitive adhesive tape comprising an elongate flexible backing sheet, an adhesive coating on one surface of said sheet, said coating including an outer continuous surface of normally tacky and pressure-sensitive material, a coating of elastic, yieldable and cohesive bonding material on the other surface of said sheet, and a plurality of relatively strong reinforcing strands extending longitudinally of said sheet and spaced laterally from each other, each of said strands comprising a plurality of associated elongate filaments, said strands being embedded in said bonding coating whereby the bonding coating substantially fills the spaces between said filaments, said strands being disconnected mechanically from each other except for said bonding coating which serves as the sole means for retaining said strands in their individual positions.

8. A reinforced pressure-sensitive adhesive tape comprising an elongate flexible backing sheet, an adhesive coating on one surface of said sheet, said coating including an outer continuous surface of normally tacky and pressure-sensitive material, a coating of elastic, yieldable and cohesive bonding material on the other surface of said sheets, and a plurality of parallel strands of strong, high tensile strength nylon extending longitudinally of said tape in said bonding coating and spaced laterally from each other whereby said strands are embedded in said bonding coating, said strands being disconnected mechanically from each other except for said bonding coating which serves as the sole means for retaining said strands in their indiivdual positions.

9. A reinforced pressure-sensifive adhesive tape comprising an elongate flexible backing sheet, an adhesive coating on one surface of said sheet, said coating including an outer continuous surface of normally tacky and pressure-sensitive material, a coating of elastic, yieldable and cohesive bonding material on the other surface of said sheets, and a plurality of parallel twisted strands of strong, high tensile strength viscose rayon extending longitudinally of said tape in said bonding coating and spaced laterally from each other whereby said strands are embedded in said bonding coating, said strands being disconnected mechanically from each other except for said bonding coating which serves as the sole means for retaining said strands in their individual positions.

10. A reinforced pressure-sensitive adhesive tape comprising an elongate flexible backing sheet, an adhesive coating on one surface of said sheet, said coating including an outer continuous surface of normally tacky and pressure-sensitive material, a coating of elastic, yieldable and cohesive bonding material on the other surface of said sheets, and a plurality of parallel twisted strands of strong, high tensile strength glass extending longitudinally of said tape in said bonding coating and spaced laterally from each other whereby said strands are embedded in said bonding coating, said strands being disconnected mechanically from each other except for said bonding coating which serves as the sole means for retaining said strands in their individual positions.

11. A reinforced pressure-sensitive adhesive tape comprising an elongate flexible backing sheet, an adhesive coating on one surface of said sheet, said coating including an outer continuous surface of normally tacky and pressure-sensitive material, a bonding coating of elastic, yieldable, and cohesive material on the other surface of said sheet, a release coating applied to said bonding coating, and a plurality of relatively strong individual reinforcing strands extending longitudinally of said sheet and spaced laterally from each other, said strands being secured in said bonding coating and disconnected mechanically from each other except for said bonding coating which serves as the sole means for retaining said strands in their individual positions.

12. A reinforced pressure-sensitive adhesive tape comprising an elongate flexible backing sheet, an adhesive coating on one surface of said sheet, said coating including an outer continuous surface of normally tacky and pressure-sensitive material, a bonding coating of elastic, yieldable, and cohesive material on the other surface of said sheet, and a plurality of relatively strong individual reinforcing strands extending longitudinally of said sheet and spaced laterally from each other, said strands being secured in said bonding coating and disconnected mechanically from each other except for said bonding coating which serves as the sole means for retaining said strands in their individual positions, said bonding coating havng a release coatng appled thereto to control the adherence between said bonding coating and said adhesive coating.

References Cited in the file of this patent

UNITED STATES PATENTS

| | | |
|---|---|---|
| 1,195,430 | Angier | Aug. 22, 1916 |
| 2,458,166 | Homeyer | Jan. 4, 1949 |
| 2,604,424 | Mathes | July 22, 1952 |
| 2,674,556 | Pahl | Apr. 6, 1954 |